United States Patent Office 3,578,498
Patented May 11, 1971

3,578,498
DESOLVENTIZING OF STARCH
Francis E. Kite, Riverside, and Joseph F. Stejskal, Brookfield, Ill., assignors to CPC International Inc., New York, N.Y.
No Drawing. Filed June 12, 1967, Ser. No. 645,528
Int. Cl. C13l 1/08, 1/00, 1/04
U.S. Cl. 127—71                                            12 Claims

ABSTRACT OF THE DISCLOSURE

Starch which has been treated with a hydrophilic organic solvent such as a low molecular weight alcohol, ketone, or the like, and which, as a result, retains relatively large quantities of the solvent, is desolventized by contacting it with a hot humid gas, such as, for example, steam or moist air, while maintaining the starch at a temperature of from about 160° F. to about 320° F. and at a moisture level of from about 1% to about 15%. The process is applicable to any type or variety of starch, in either non-gelatinized or pregelatinized form; the process does not alter or otherwise affect the properties of the starch.

---

This invention relates to a process for removing non-aqueous, volatile, hydrophilic, organic liquids from sensitive materials. By the term "sensitive materials" is meant materials which can be damaged, or whose physical and/or chemical properties can be altered, when subjected to conditions of moisture and/or high temperatures. Examples of such materials are proteins, vegetable gums, and starches. In the following discussion, the process of the invention will be discuseed in connection with starch. It should be understood, however, that the process is equally applicable to removal of organic liquids from other sensitive materials as well.

In the following specification the term "solvents" will be used to denote non-aqueous, volatile, hydrophilic, organic liquids, such as low molecular weight alcohols or ketones, e.g. methanol, ethanol, propanol, acetone, etc.

The process of the invention is applicable to all varieties of starch (e.g. those derived from any source, such as corn, high amylose corn, wheat, potato, waxy maize, tapioca, sorghum, sago, rice, etc.); starch fractions (i.e. amylose or amylopectin); derivatized starches (e.g. esterified or etherified starch); modified starches (such as thin-boiling starch); converted starches (e.g. dextrines); as well as starch in either non-gelatinized form or in pregelatinized form (i.e. cold-water-swelling starch). In the following specification and claims it will be understood that the term "starch" is intended to include any and all of the aforementioned.

In many processes for modifying the physical and chemical properties of starch, it is sometimes necessary to employ an organic solvent, such as a low molecular weight alcohol or ketone, to obtain the desired property. As examples, the solvent may function as a reaction medium to prevent starch swelling during a chemical treatment, as a solvent for water-insoluble chemical reagents to facilitate their reaction with starch, or as solvents for reagent by-products which are difficult to remove with water. Also, organic solvents may be used to dissolve and thereby remove naturally occurring fats from starch. Uses of organic solvents to accomplish these functions are well known, but no effective method has been developed for substantially complete removal of such solvents from the starch after treatment. Such removal is, of course, necessary if the starch is to be used for food purposes. Conventional purification treatments do not effectively remove the residual solvent regardless of the degree of treatment. This invention provides an economical and effective process for substantially complete removal of hydrophilic organic solvents from starch.

It is hypothesized that most of the solvent is easily removed using conventional separation systems such as filtration or centrifugation followed by conventional drying methods but that the remainder of the solvent is more tenaciously held in the starch by some physical forces, such as adsorption or complexing with the starch. These residual solvent levels are not removed to acceptable food grade levels by the aforementioned conventional systems, nor are they removed by prolonged water washing, where applicable, or by washing with non-aqueou solvents such as carbon tetrachloride as reported by Valletta et al. (Journal of Polymer Science: part A, volume 2, pp. 1085–1094, 1964) or by treatment with dry gases such as hot air, hexane or carbon dioxide, nor by drying to constant weight at 113° C. over $P_2O_5$ in vacuo as reported by Valletta et al. Our evaluation of residual solvent levels in such exposed and treated starches after drying by conventional methods ranged as follows:

| Drying method | Solvent | Residual solvent (p.p.m.) |
|---|---|---|
| Flash drying | Methanol | 10,000–50,000 |
| Vacuum drying: | | |
| Stokes vacuum oven (4 hours, 212° F., 23 inches vacuum). | do | 5,000–12,000 |
| Laboratory vacuum oven (4 hours, 120° C., 30 inches vacuum). | do | 1,000–5,000 |
| Forced air oven (tray type): | | |
| 60° C. (16 hours) | do | 1,000–8,000 |
| Do | Acetone | 9,000 |
| Do | Ethanol | 13,000 |
| Do | Isopropanol | 15,000 |

Further, we have found that water washing of a methanol-treated non-gelatinized starch such as corn starch resulted in a residual methanol level of from 400 to 800 p.p.m. Water washing cannot be applied to a cold-water-swelling starch since on contact with water it swells and assumes a pasted and non-filterable state. It has been reported by Valletta, et al., that starches treated in the presence of methanol or n-propanol after being washed three times with carbon tetrachloride still retained 0.67% methanol or 1.4% n-propanol. We have also found that cold-water-swelling starches as well as the non-gelatinized starches containing alcohol when exposed to a flow of hot dry air, hexane or carbon dioxide exhibited no significant change in residual solvent level from that remaining after conventional drying.

The present invention provides a practical and economical method for the removal of these residual solvents to extremely low levels (less than 300 p.p.m.) from pregelatinized cold-water-swelling starches as well as from non-gelatinized starches without otherwise affecting the product. In accordance with this invention, the residual solvent can be removed from the starch by treating the starch containing the solvent with a flow of hot humid gas, including steam, wherein the moisture level of the starch is maintained in the range of about 1% to 15% (based on the total weight of the starch plus moisture). In the following description and in the appended claims it will be understood that the term "hot humid gas" is intended to include steam, unless stated otherwise. We have found that the rate of solvent removal is dependent upon both the temperature of the starch during treatment and the relative humidity of the gas with respect to the temperature of the starch. The rate of solvent removal is inrceased as both starch temperature and relative humidity of the gas with respect to the starch temperature are increased. Further, the method is applicable to both non-gelatinized starches and to water-sensitive cold-water-swelling starches. The treatment does not cause the starch to swell, cake or become a paste during desolventizing.

More particularly, the present invention provides a process for reducing the organic solvent level of starch to less than 300 p.p.m., by heating the starch to a temperature of 160° to 320° F., preferably from 217° to 275° F., in a suitable container, and by passing through the bed of heated starch a flow of hot humid gas with a relative humidity with respect to the starch bed temperature of 40% up to and including steam, but preferably not above about 75% relative humidity when desolventizing cold-water-swelling starches. Relative humidity levels below 40% may be used, but removal rate is too slow to be commercially practical; above 75% relative humidity, the cold-water-swelling starches become sticky or tacky and begin to form lumps and cakes which result in improper contact, thus slowing solvent removal rate and producing high percentages of hard gritty particles. The preferred relative humidity range, when desolventizing cold-water-swelling starches, is from about 40% to about 65%.

The time of treatment is merely that time necessary to reduce the solvent to the desired level under the treatment conditions employed. As will be seen from the examples the treatment times are generally quite short, one hour usually being more than adequate to lower the solvent level to below 300 p.p.m. It should be noted that extended treatment times do not adversely affect the properties of the starch; it appears, therefore, that there is no actual "upper limit" to the time of treatment, except that an unnecessarily long treatment time would adversely affect the economics of the process.

The desolventizing method of the invention can be employed by any mechanical means where the starch can be heated and exposed to a flow of hot humid air or steam. Several methods are suggested although the desolventizing process is not limited to these suggested mechanical methods; for example, by passing the flow of hot humid gas or steam over a tray of heated material in a tunnel dryer or a forced air oven; by passing the flow of hot humid gas or steam into an agitated and heated bed of material in a pot, or a ribbon-type blender, or a rotary dryer; or by passing the flow of hot humid gas or steam through the heated material in a fluid bed. We have found the fluid bed technique to be an extremely effective method for removal of residual solvents, in that it insures intimate contact between the starch and the humid gas or steam.

The following examples will illustrate the practice of the invention. They are presented for illustrative purposes only, and should not be construed as limiting the scope of the invention in any way.

The apparatus used in the examples was a simple fluid bed device, which consisted of a jacketed upright tube with an inlet port positioned at the bottom of the tube. The starch was placed in the bottom of the tube, and the humid air or steam was introduced through the inlet port, thereby fluidizing and, of course, desolventizing the starch.

The temperature within the tube was maintained by passing a heating medium, e.g. superheated steam, through the outer jacket.

The humid air employed in the examples was prepared by completely saturating air at a temperature below that of the starch bed, and then passing this saturated air through the starch. The relative humidity of the air with respect to the temperature of the starch bed was then calculated. For this reason, in the examples the relative humidities of the humid air are reported as "calculated" relative humidities.

EXAMPLE I

This example illustrates methanol removal by humid air treatment of a heated bed of starch and the effect on solvent removal rate as the relative humidity and subsequent starch moisture level is increased at a constant starch bed temperature.

A cold-water-swelling (i.e., pregelatinized) corn starch containing 4600 p.p.m. of methanol was placed in a fluid bed column and heated to 217° F. A flow of hot humid air was passed through the starch bed at sufficient rate to cause fluidization (0.2 c.f.m.). The rates of methanol removal at various humidity levels are as follows:

| Temperature (° F.) at which air was saturated | Calculated RH (percent) of the air in contact with the starch | Treatment time (minutes) to obtain residual methanol levels of (p.p.m.)— | | | | Final starch moisture (percent) |
|---|---|---|---|---|---|---|
| | | 500 | 100 | 50 | 25 | |
| 175 | 44 | 18 | 37 | 50 | 71 | 6.0 |
| 185 | 55 | 12 | 27 | 35 | 46 | 7.4 |
| 194 | 65 | 5 | 13 | 19 | 27 | 10.0 |

These data illustrate that solvent removal rate is increased as humidity level of the fluidizing air is increased at a constant starch bed temperature. Turbulent flow in the fluid bed was readily maintained with cold-water-swelling starches up to relative humidity level of 75% with respect to bed temperature when starch moisture did not exceed 12 to 15%. At relative humidities above 75% and starch moistures above 12 to 15%, the rate of solvent removal was significantly slower due to a loss of turbulent flow, i.e., the cold-water-swelling particles began to ball up, cohere and agglomerate, and channeling plus plug flow occurred in the bed.

EXAMPLE II

This example illustrates the effect of moisture in cold-water-swelling starch during desolventizing on particle character and rate of solvent removal.

A cold-water-swelling corn starch containing methanol is excess of 25% and moisture levels of from 1% to 21% was treated for 30 minutes in the fluid bed with air saturated at 188° F. at a bed temperature of 217° F. The calculated relative humidity was 56%. The final starch moisture levels after treatment were 7 to 8% and residual methanol contents were as follows:

| Percent initial mositure (based on total wt. of starch and moisture) | $CH_3OH$, p.p.m., after desolventizing |
|---|---|
| 1.0 | 10 |
| 5.4 | 14 |
| 8.1 | 12 |
| 12.0 | 35 |
| 15.0 | 308 |
| 18.0 | 587 |
| 21.0 | 959 |

All products above the line originally contained 15% or less mositure. Methanol was removed rapidly and the products containing less than 15% moisture exhibited no caking or formation of grit whatsoever during the desolventizing process. The products containing 15% moisture caked slightly during desolventizing. Those products containing more than 15% moisture balled and formed chunks and grit during desolventizing. The rate of solvent removal became progressively slower at moisture levels above about 15%, and the formation of grit and caking increased.

EXAMPLE III

This example illustrates the effect of bed temperature at a constant relative humidity at that bed temperature.

The same starch as used in Example I was placed in the fluid bed and the methanol removed by a flow of hot humid air at 65% (calculated) relative humidity with respect to bed temperatures of 180° F. to 235° F. All desolventized products contained final moisture levels of 9 to 10 %.

| Temperature ° F. | | Methanol content (p.p.m.) after treatment for (min.)— | | | | | |
|---|---|---|---|---|---|---|---|
| Starch bed | Saturated air | 0 | 5 | 15 | 25 | 30 | 60 |
| 180 | 162.5 | 4,600 | | 192 | | 70 | 15 |
| 194 | 175 | 4,600 | | 94 | | 59 | 11 |
| 217 | 194 | 4,600 | 370 | 80 | | 22 | |
| 235 | 211 | 4,600 | 175 | 44 | 20 | | |

These data show that the rate of methanol removal is accelerated as the starch bed temperature is increased at a constant relative humidity with respect to bed temperature.

EXAMPLE IV

This example illustrates effective removal of residual solvent from a cold-water-swelling grain sorghum starch containing 12,000 p.p.m. of methanol.

The sorghum starch was treated at the preferred conditions with a flow of air saturated with moisture at 194° F.; the air was 65% relative humidity (calculated) with respect to a starch bed temperature of 217° F.

| Time of treatment (minutes): | Residual methanol, p.p.m. |
|---|---|
| Zero | 12,000 |
| 12 | 500 |
| 27 | 100 |
| 35 | 50 |
| 43 | 25 |

EXAMPLE V

This example illustrates the removal of methanol from starch by a flow of steam in a heated fluid bed. Two samples of non-gelatinized corn starch, each containing about 1,000 p.p.m. of methanol, were desolventized in the following manner. The starch was placed in the fluid bed and heated to 230°–235° F. while steam at 214° F. (which was superheated to about 240° F. prior to admission into the apparatus), was passed through the bed. Duplicate runs after a 30-minute treatment produced products containing only 13 and 16 p.p.m. of methanol and 7.4 and 8.0% moisture.

The process was then repeated with a cold-water-swelling corn starch which contained approximately 2,000 p.p.m. methanol. After 30 minutes the product contained 15 p.p.m. methanol and 8.0% moisture; no agglomeration or loss of product properties occurred.

EXAMPLE VI

This example illustrates the removal of various non-aqueous solvents from solvent-treated corn starch products by hot humid air treatment of the heated starch in a fluid bed.

Treatment conditions:
  Starch bed temperature—217° F.
  Humid air—56% RH (saturated at 188° F.)

| Solvent | Solvent (p.p.m.) before treatment | Time of treatment, min. | Solvent (p.p.m.) after treatment |
|---|---|---|---|
| Acetone | 800 | 30 | 300 |
| Ethanol | 11,400 | 60 | 280 |
| Isopropanol | 375 | 30 | 94 |

EXAMPLE VII

This example illustrates that no significant changes in product properties occur during solvent ($CH_3OH$) removal by humid air treatment of the heated starch in the fluid bed. Two runs were made.

Treatment conditions:
  Starch bed temperature—217° F.
  Humid air —65% RH (saturated at 194° F.)
  Time—60 minutes
Starch products:
  Cold-water-swelling (pregelatinized) corn starch The two pregelatinized starches, designated as A and B, were analyzed for the following properties before and after the desolventizing treatment: percent solubles, swelling power, viscosity.

Percent solubles and swelling power were determined in the following manner: 5 grams of starch (dry basis) were suspended in 200 ml. of water in a tared centrifuge bottle with gentle stirring. While stirring continuously, the starch suspension was held in a water bath at the desired temperature for 30 minutes. The bottle was then stoppered and centrifuged for 15 minutes at 2200 r.p.m. (i.e. 700 times gravity). The supernatent was separated from the precipitated paste by decanting or siphoning.

To determine percent solubles (i.e. soluble starch) 50 ml. of the supernatent is evaporated to dryness, the residue is weighed, and the percent solubles calculated as follows:

$$\text{Percent solubles} = \frac{\text{gms. soluble starch in 50 ml. supernatent} \times 4}{\text{sample weight (dry basis)}} \times 100$$

Swelling power is determined by weighing the precipitated paste and calculating as follows:

Swelling power (corrected for solubles)
$$= \frac{\text{Weight of precipitated paste}}{\text{Weight of sample (dry basis)} - \text{weight of solubles}}$$

Viscosity is reported as the percent concentration of starch required to produce a 50-poise aqueous paste at 25° C., as measured with a model LVF Brookfield viscometer.

The results are as follows:

| | Percent solubles | | Swelling power | | Viscosity [1] | $CH_3OH$ (p.p.m.) |
|---|---|---|---|---|---|---|
| | 25° C. | 85° C. | 25° C. | 85° C. | | |
| Product: | | | | | | |
| A (before) | 6.2 | 12.4 | 11.4 | 15.5 | 7.5 | 5,000 |
| A (after) | 5.9 | 11.7 | 11.9 | 15.9 | 7.5 | 9 |
| B (before) | 5.9 | 14.1 | 12.5 | 17.3 | 7.7 | 950 |
| B (after) | 5.6 | 14.0 | 12.4 | 17.8 | 7.6 | 40 |

[1] Percent concentration of 50-poise aqueous paste when prepared at 25° C.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A process for treating refined starch which contains retained solvent in excess of 300 p.p.m., wherein said solvent is a non-aqueous, volatile, hydrophilic organic liquid selected from the group consisting of low molecular weight alocholos, low molecular weight ketones, and mixtures thereof, in order to reduce the amount of solvent to below 300 p.p.m. without adversely affecting the properties of the starch, consisting essentially of:
  contacting the starch with hot humid gas having a relative humidity of at least about 40%,
  while maintaining the starch at a temperature of from about 160° F. to about 320° F. and at a mositure level of from about 1% to about 15%, based on the total weight of the starch plus the moisture,
  for a time sufficient to reduce the level of the solvent to below 300 p.p.m.

2. The process of claim 1, wherein the starch is maintained at a temperature of from about 217° F. to about 275° F.

3. The process of claim 1, wherein the starch comprises non-gelatinized starch.

4. The process of claim 1, wherein the starch comprises a cold-water-swelling starch, and wherein the relative humidity of the gas is within the range of from about 40% to about 75%.

5. The process of claim 1, wherein the starch comprises a cold-water-swelling starch, and wherein the relative humidity of the gas is within the range of from about 40% to about 65%.

6. The process of claim 1, wherein the starch comprises a cold-water-swelling starch and wherein the relative humidity of the gas is about 65%.

7. The process of claim 1, wherein the starch is fluidized during the treatment with the hot humid gas.

8. A process for treating refined starch which contains retained solvent in excess of 300 p.p.m., wherein said solvent is a non-aqueous, volatile, hydrophilic organic liquid selected from the group consisting of low molecular weight alcohols, low molecular weight ketones, and mixtures thereof, in order to reduce the amount of solvent to below 300 p.p.m. without adversely affecting the properties of the starch, consisting essentially of:

contacting the starch with steam, while maintaining the starch at a temperature of from about 220° F. to about 320° F. and at a moisture level of from about 1% to about 15%, based on the total weight of the starch plus the moisture, for a time sufficient to reduce the level of the solvent to below 300 p.p.m.

9. The process of claim 8, wherein the starch is maintained at a temperature of from about 220° F. to about 275° F.

10. The process of claim 8, wherein the starch comprises a non-gelatinized starch.

11. The process of claim 8, wherein the starch comprises a cold-water-swelling starch.

12. The process of claim 8, wherein the starch is fluidized during the treatment with the steam.

References Cited

UNITED STATES PATENTS

| | | | |
|---|---|---|---|
| 2,254,867 | 9/1941 | Bonotto | 34—27X |
| 2,280,723 | 4/1942 | Schoch | 127—71 |
| 2,587,650 | 3/1952 | Rist | 127—71 |
| 2,709,674 | 5/1955 | Bergstrom | 34—10X |
| 2,813,352 | 11/1957 | Payne et al. | 34—10 |
| 2,880,093 | 3/1959 | Kuhlmann et al. | 34—10X |
| 3,367,034 | 2/1968 | Good | 34—10 |

OTHER REFERENCES

Broughton, "Techniques of Org. Chem.," III, pp. 817–819, 822, 3 (1956).

Schoch (I), "Methods in Carbohydrate Chem.," pp. 56–59 (1964).

MORRIS O. WOLK, Primary Examiner

D. G. CONLIN, Assistant Examiner

U.S. Cl. X.R.

34—10; 127—32, 33, 65